US009154455B1

(12) United States Patent
Dropps

(10) Patent No.: US 9,154,455 B1
(45) Date of Patent: Oct. 6, 2015

(54) METHOD AND SYSTEM FOR DETERMINING DROP ELIGIBILITY OF NETWORK INFORMATION

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Vijo, CA (US)

( * ) Notice: Subject to any disclaimer, the term of this patent is extended or adjusted under 35 U.S.C. 154(b) by 106 days.

(21) Appl. No.: 14/014,803

(22) Filed: Aug. 30, 2013

(51) Int. Cl.
*H04L 12/56* (2006.01)
*H04L 12/861* (2013.01)

(52) U.S. Cl.
CPC .................................. *H04L 49/9084* (2013.01)

(58) Field of Classification Search
CPC ........................................................ H04L 47/52
See application file for complete search history.

(56) References Cited

U.S. PATENT DOCUMENTS

| 6,108,307 | A  | * | 8/2000 | McConnell et al. | 370/235 |
| 2002/0118640 | A1 | * | 8/2002 | Oberman et al. | 370/230 |
| 2007/0268823 | A1 | * | 11/2007 | Madison et al. | 370/229 |
| 2009/0252038 | A1 | * | 10/2009 | Cafiero et al. | 370/235 |

* cited by examiner

*Primary Examiner* — Samina Choudhry
(74) *Attorney, Agent, or Firm* — Klein, O'Neil & Singh, LLP

(57) ABSTRACT

Method and system for a network device having a plurality of queues for receiving information from another device is provided. A frame is received at a receive queue of the network device. The process determines that the receive queue of the network device has reached a programmable threshold value and determines if a frame waiting at the receive queue is eligible for being dropped. The frame is eligible for being dropped when a drop eligibility bit is set in a frame header by a sender of the frame, when a priority established for the frame indicates that the frame is drop eligible and when a destination for the frame is congested.

18 Claims, 6 Drawing Sheets

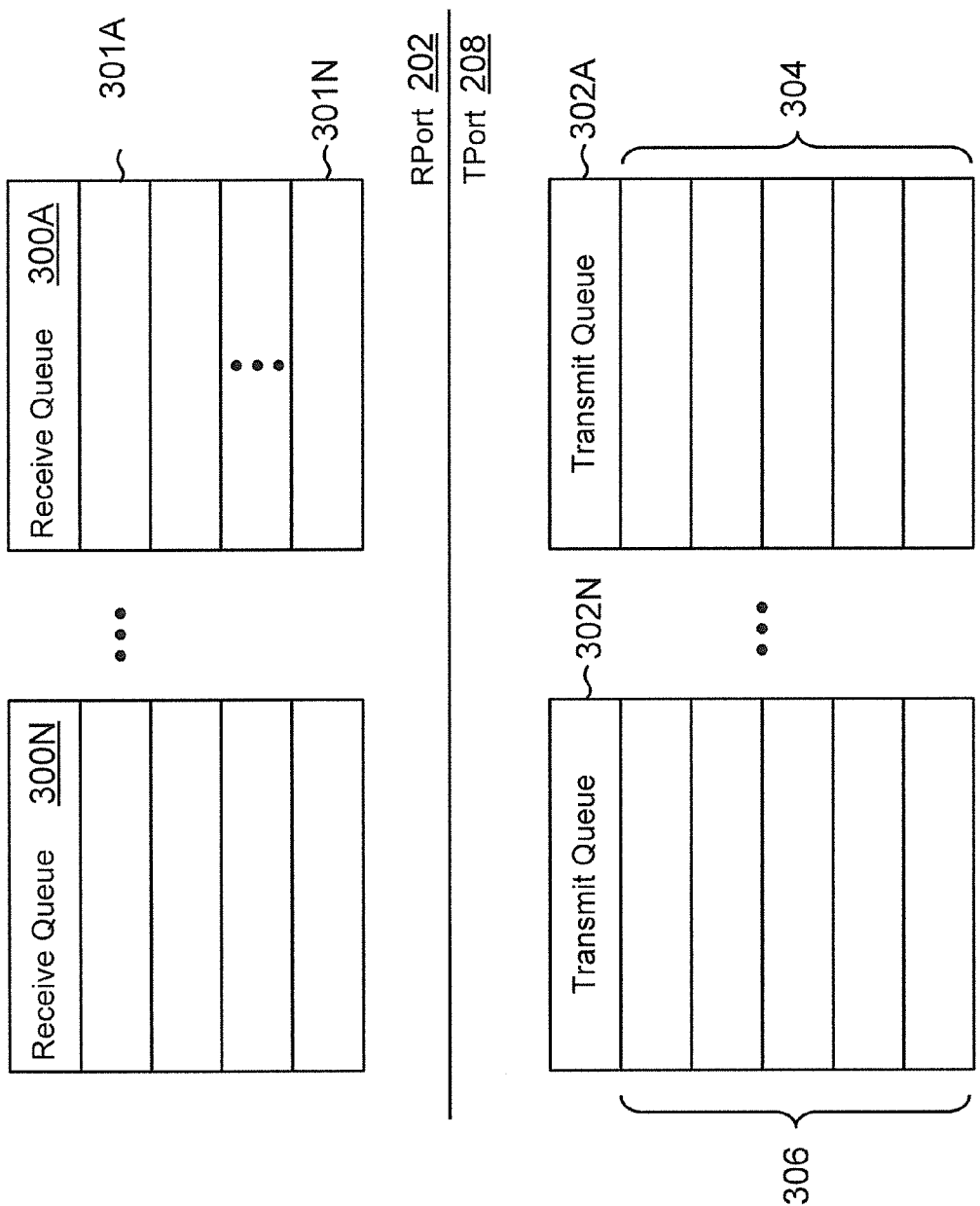

METHOD AND SYSTEM FOR DETERMINING DROP ELIGIBILITY OF NETWORK INFORMATION

BACKGROUND

1. Technical Field

The embodiments disclosed herein are related to networks and network devices.

2. Related Art

Networking systems are commonly used to move network information (which may also be referred to interchangeably, as frames, packets, data or commands) between computing systems (for example, servers) or between computing systems and network devices (for example, storage systems). Various hardware and software components are used to implement network communication. Different network and storage protocols may be used to handle network information and storage information.

Network devices for example, switches, adapters and others typically communicate using ports that have logic and circuitry for sending and receiving information. The ports typically use receive buffers (or memory storage devices) for receiving and temporarily storing information (for example, frames, packets and other information), before information is sent to an appropriate destination. Continuous efforts are being made to improve the use of receive buffers in network devices.

BRIEF DESCRIPTION OF THE DRAWINGS

The various present embodiments now will be discussed in detail with an emphasis on highlighting the advantageous features. These embodiments depict the novel and non-obvious systems and methods for network devices shown in the accompanying drawings, which are for illustrative purposes only. These drawings include the following figures, in which like numerals indicate like parts:

FIG. 1 is a functional block diagram of a network that the present embodiments may be used in connection with;

FIG. 3A shows an example of receive and transmit queues, according to one embodiment;

DETAILED DESCRIPTION

Figure 1:
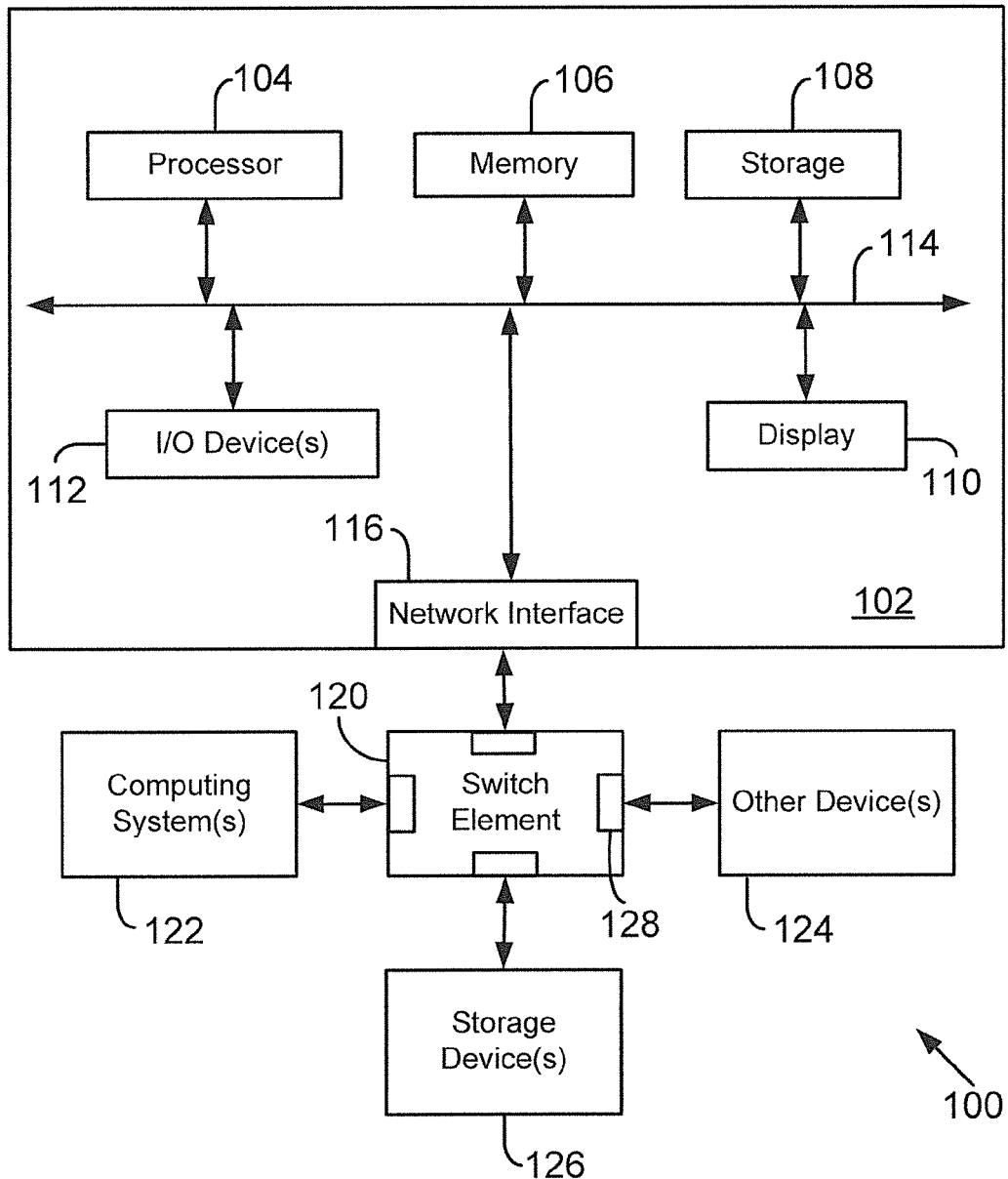

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual frames called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environments. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse and others. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, a host bus adapter, a network interface card or any other network adapter type. The embodiments described herein may be implemented in network interface 116.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports 128. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 the host system 102 and an interface (not shown) for the storage devices 126. Fabric ports are typically located in Fabric devices, such as a network switch element, for example, switch element 120.

Figure 2A:
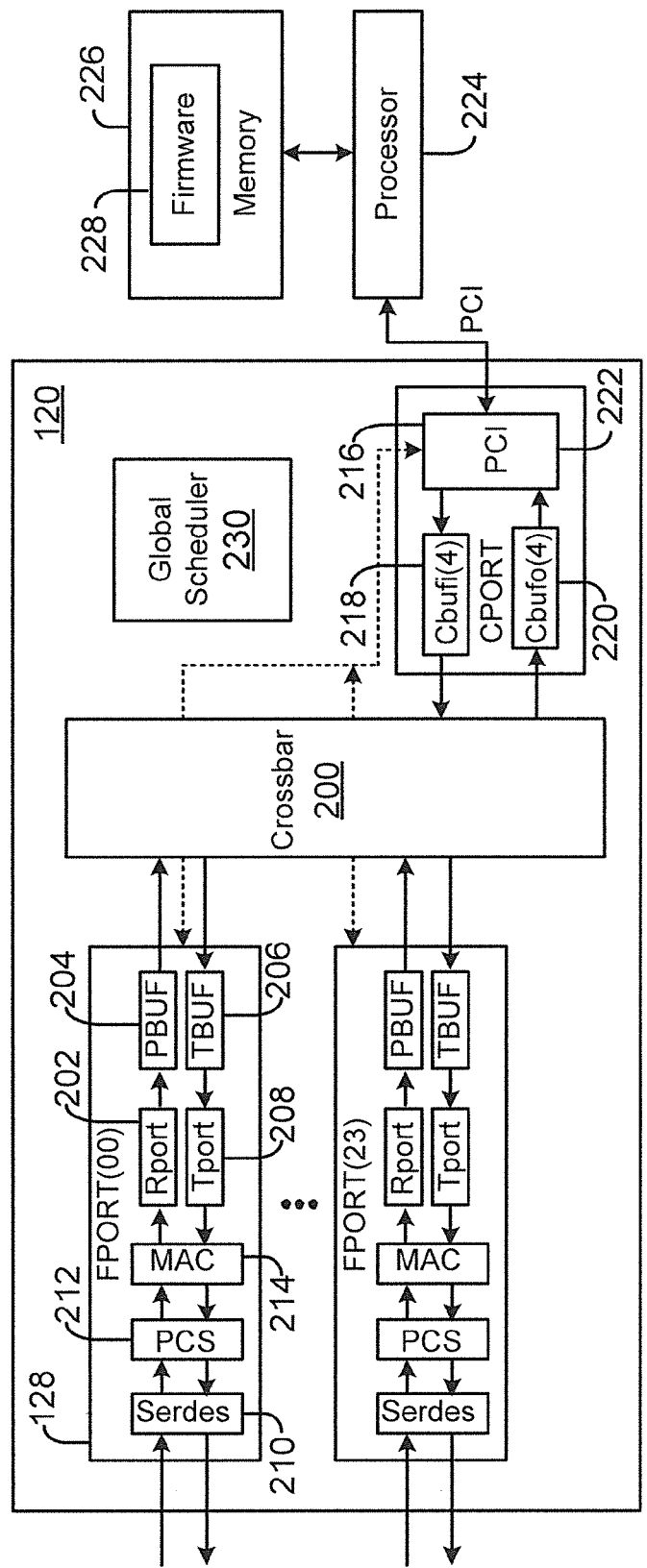
FIG. 2A is a functional block diagram of a switch element according to the present embodiments.

FIG. 2A is a high-level block diagram of switch element 120, also referred to as the switch 120. It is noteworthy that the embodiments disclosed herein are not limited to switch element 120 and may be implemented and practiced in other network device type, for example, adapter, NICs and other device types.

Switch element 120 may be implemented as an application specific integrated circuit (ASIC) having a plurality of ports 128. Frames are received at ports 128 and a global scheduler 230 (also referred to as scheduler 230) then schedules frame processing/transmission for all ports 128.

Ports 128 are generic (GL) ports and may include an N_Port, F_Port, FL_Port, E-Port, or any other port type. Ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT (or receive segment) 202 temporarily stores received frames at a memory storage device, shown as PBUF (pause buffer) 204. The frames are then sent to a transmit segment (or transmit port (TPORT) 208 via the crossbar 200. The TPORT 208 includes a memory device shown as a transmit buffer (TBUF) 206. The TBUF 206 may be used to stage frames or information related to frames before they are transmitted. The TPORT 208 may also include a shared MAC and PCS or use the MAC and PCS of RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port 128 to be configured into a plurality of independently, operating sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
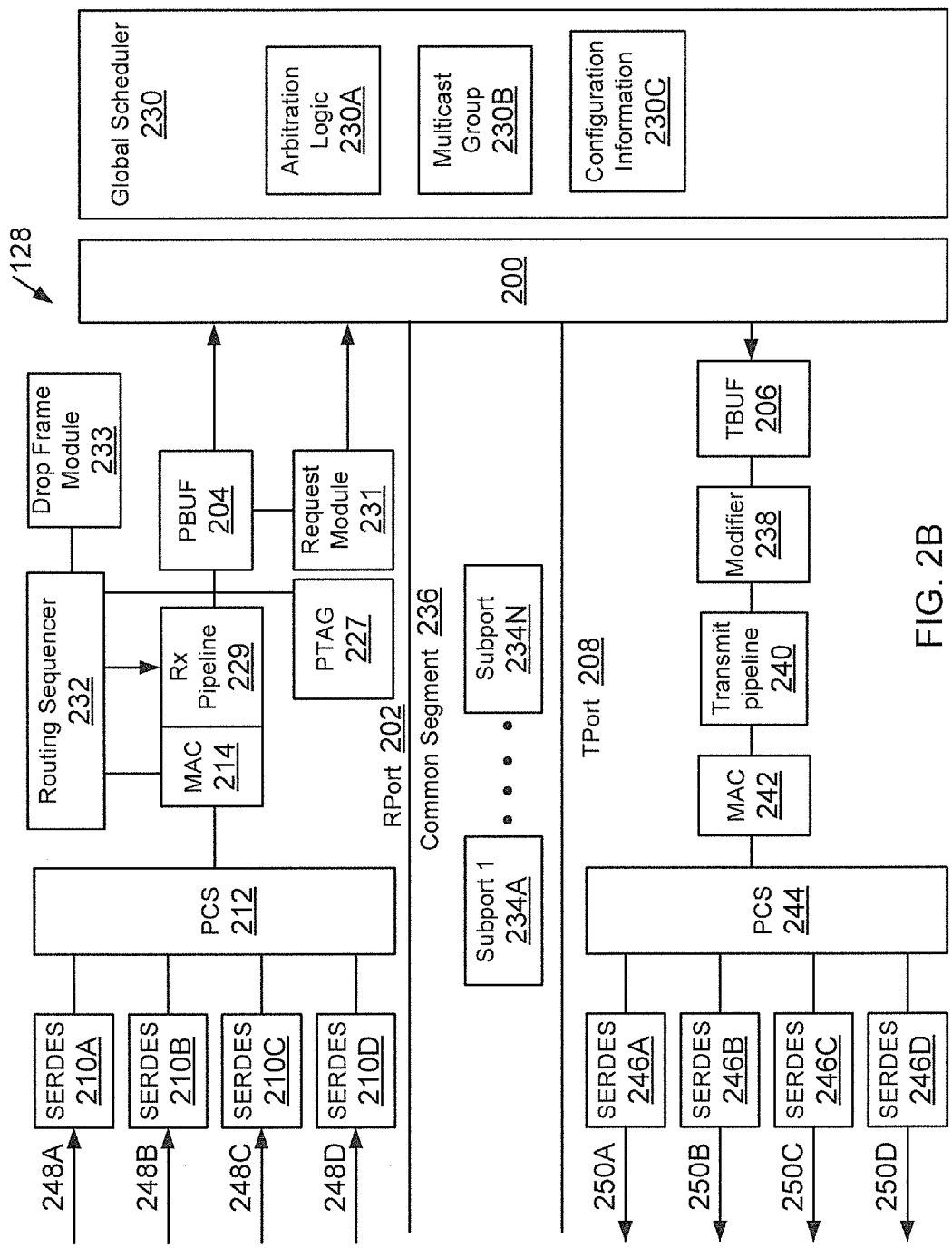
FIG. 2B shows a block diagram of a receive segment, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128.

In one embodiment, base-port 128 may be configured to include a plurality of sub-ports, each identified uniquely, to operate as an independent port. The configuration information/logic 234A-234N for each sub-port may be stored in common segment 236.

RPORT 202 may include or have access to a plurality of network links, for example, four independent physical network links (or lanes) 248A-248D, each configured to operate as a portion of an independent sub-port within base-port 128. Each network link is coupled to a SERDES 210A-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a port of receive pipeline 229.

Incoming frames are received via one of the network links 248A-248N. The received frame is processed by the appropriate SERDES and then sent to the PCS 212. After PCS 212 processes the frame (for example, performs data decoding), the frame is provided to MAC 214 that is time shared among a plurality of sub-ports. This means that for a certain time segment (for example, clock cycles), a MAC 214 pipeline stage may be used by one of the sub-ports. Other MAC 214 pipeline stages may be used by different Sub_Ports in a given clock cycle or time segment. After the MAC 214 processes the frame it is sent to receive pipeline 229 that is also time shared. Information regarding the frame or a copy of the frame is also provided to a routing sequencer 232 that determines the destination of the received frames.

In one embodiment, a frame whose destination is processor 224 is given the highest priority, followed by a frame that is routed by a ternary content addressable memory (TCAM) or steering registers located within a routing sequencer 232. It is noteworthy that more than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

If the receive queues become full or have reached a programmable threshold value, then a drop frame module 233 determines if a frame can be dropped to make room at the queues. Details regarding drop frame module 233 are provided below with respect to FIGS. 3B and 4.

Information regarding the received frames may be stored at another memory device, shown as PTAG 227. The information at PTAG 227 may be referred to as tags that are generated by routing sequencer 232 and may have various fields. The various fields may include Tx (transmit) Sub_Port number, Tx Physical Queue Number, CPORT identifier value, a "Valid" indicator indicating that a frame is valid, a Rx (receive) Physical Queue number, SOF (a start of frame) Address, Rx Sub_Port number, a transmit virtual queue number, a destination transmit sub-port number, frame priority, an Ethernet type field, if any, a timestamp, error correction code and others. A tag is initialized when a frame is processed at a PBUF 204 queue. The tag is active as long as the frame is in the PBUF queue. When the receive queue location is empty, the tag is marked invalid. The tags are used by a read module and write module (not shown) that manages read/write operations to and from PBUF 204. PTAG 227 may also be used to stage requests for moving frames stored at the PBUF 204 receive queues, before the requests are sent to scheduler 230.

To move frames from the receive queues; a request module 231 generates requests for the global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and transmit queues and some of that information may be used to select requests. Scheduler 230 includes arbitration logic 230A that performs dual stage arbitration for processing requests from various base-ports. Scheduler 230 also maintains a data structure at a memory labeled as multicast group 230B. The data structure stores information for identifying multicast groups that may receive multicast frames i.e. frames that are destined to multiple destinations. Scheduler 230 uses the information for processing requests that involve multicast frames.

Frames for transmission via TPORT 208 move via TBUF 206 and a modifier 238. In one embodiment, modifier 238 may be used to insert, change or remove information from an outgoing frame. The modification is based on the frame type and transmit virtual queue maintained at TPORT 208. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. In one embodiment, links 248A-248D and 250A-250D are part of the same physical links that are used to receive and transmit information.

FIG. 3A shows an example of a plurality of receive queues 300A and 300N at RPort 202. Each receive queue may include a plurality of storage locations 301A-301N. The receive queues 300 may be maintained at PBUF 204 and are used to temporarily store incoming frames, while a request to move the frame is presented to scheduler 230. Each queue/location is identified by a queue number or identifier. This information may be included in a tag that is stored at PTAG 227 and sent to scheduler 230.

The transmit side may also have a plurality of transmit queues 302A-302N with storage locations 304/306. Each transmit queue is identified by a unique Tx Queue Number. The transmit queues are used to store frames or information regarding frames and to manage transmit credit at TPort 208. A transmit queue may be associated with a given class of service, virtual lane, virtual channel, frame priority or other ways of link segregation. When a frame is received, the routing scheduler may assign a transmit queue to the frame. The transmit queue information is then inserted in a tag that is generated by the routing scheduler 232 and stored at PTAG 227.

Figure 3B:
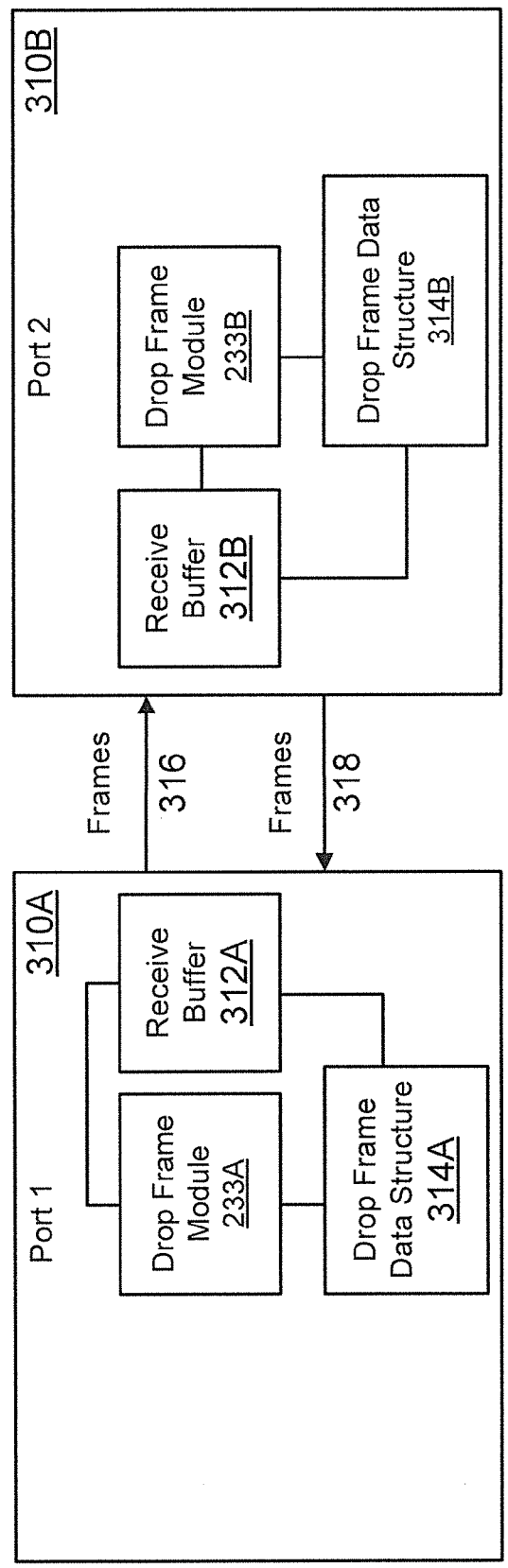
FIG. 3B shows a block diagram of two communicating ports.

FIG. 3B shows an example of two ports 310A/310B communicating by sending frames 316 and 318. Frames 316 are stored at a receive buffer 312B, while frames 318 are stored at receive buffer 312A. The receive buffer in this context may be at PBUF 204.

To avoid overflowing of receive buffer queues, often a threshold is established for each queue. The threshold values determine how much of a queue can be filled with frames and information. When a threshold is reached, frames may be discarded or "dropped". Drop frame module 233A at port 310A uses a drop frame data structure 314A to determine if a frame is eligible for dropping, according to one embodiment. Drop frame module 233B at port 310B uses a drop frame data structure 314B to determine if a frame is eligible for dropping, according to one embodiment. The data structure 314A and 314E may be stored at PTAG 227 or any other memory storage location.

In conventional systems, the decision to drop a frame is typically made based on the state of the receiver buffers/queues only. The embodiments described herein use a comprehensive approach to determine which frame should be dropped based on a plurality of factors, as described below in detail.

The data structures 314A/314B may be used to store a state of each receive queue at the receive buffers, age of received frames; and information regarding destination ports (for example, information regarding whether a destination port is congested or not). A frame sender may also set a bit in a frame header to indicate that the frame may be dropped or the frame is eligible for dropping (referred to as the DEI bit). This information may also be stored at the drop frame data structures.

In one embodiment, congestion information at a destination may be obtained by "QCN" (quantized congestion notification). QCN is part of the IEEE® Data Center Bridging (DCB) standard proposal aimed at enhancing existing IEEE® 802.1 bridge specifications to satisfy requirements for I/O (input/output) consolidation. The goal of QCN is provide end-to-end congestion notification for Layer 2 networks.

In another embodiment, ETS information is used for dropping a frame. ETS means Enhanced Transmission Selection as provided by IEEE 802.1Qaz. ETS defines priority-based processing and bandwidth allocation on different traffic classes with different traffic types (i.e. LAN, SAN, IPC). Thus if a destination port is limited by ETS, then a frame may be eligible for dropping, as described below.

The data structures 314A/314B may be arranged so that drop eligible priorities can easily be identified. A link list may be used to link frames with the DEI bit set. This link list would also identify the age order of the frames so that an oldest frame may be selected for being dropped.

Figure 4:
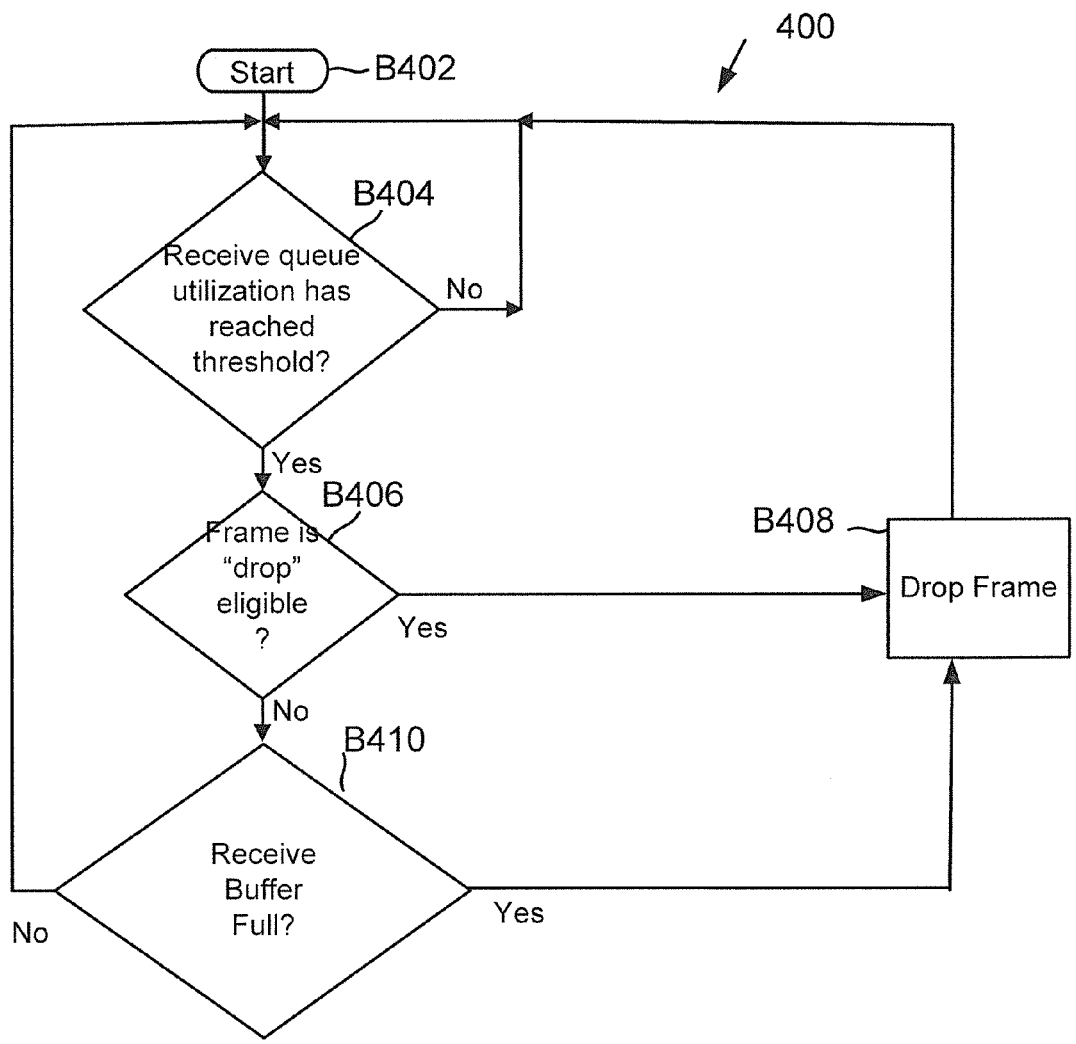
FIG. 4 shows a process flow diagram for determining drop eligibility of information received at a port of a network device, according to one embodiment.

FIG. 4 shows a process 400 for determining which frame if any should be dropped, according to one embodiment. Process 400 first examines the receive buffer queue state for a receive buffer queue at any given time. If the receive buffer queue is below the threshold, then no frames are dropped. If a new frame is received and the receive buffer queue selected for that frame, has a utilization above the threshold, then additional checking is performed. It is noteworthy that there may be different threshold values for the queues if QCN or ETS features were active for a device port.

In one embodiment, a preferred order may be used to select a packet, when a packet is to be dropped. A first preference may be to drop the oldest packet in the receive buffer queue that has a DEI bit set and is also limited by QCN or ETS. The second preference may be to drop the oldest frame in the receive buffer queue that has the DEI bit set and is not limited by QCN or ETS. The third preference may be to drop the oldest frame of a drop eligible priority that is also limited by QCN or ETS. The forth preference would be to drop the oldest frame of a drop eligible priority that is not limited by QCN or ETS. There may be a different preference order when a packet is to be dropped because the receive buffer queue will overflow because none of the other drop eligible criteria is met.

Referring now to FIG. 4, process 400 begins in block B402, when ports 310A-310B are initialized and operational. As an example, frames 316 are stored at receive buffer 312B having a plurality of queues (for example, 300A-300N).

In block B404, the process determines if a receive queue utilization has reached its threshold value. The threshold value is set to avoid receive buffer overflow situations reduce congestion and increase overall network bandwidth. The threshold value may be stored at the common segment 236 and used by the routing sequencer 232 to determine this step.

If the threshold is reached, then in block B406, the drop frame module 233B determines if a frame is drop eligible. If the frame is drop eligible, then the frame is dropped in block B408. If not, then in block B410, the process determines if the receive buffer queue is full. If yes, then the frame is dropped in block B408, otherwise, the process moves back to block B404.

Unlike conventional system, as described above, the determination in block B406 is based on a plurality of factors. For example, if the frame has the DEI bit set and the frame destination is congested (QCN) or limited by bandwidth (ETS), then the frame is more likely to be dropped. If a frame has a priority that is not drop eligible and another frame that may be waiting at the receive buffer queue is drop eligible, then the frame already in the receive queue is dropped to make space for the newly arrived frame. If the frame with a non-drop eligible priority has the DEI bit set and the frame with the drop eligible priority does not have the DEI bit set, then the new frame with the DEI bit set is dropped.

In yet another embodiment, if two frames that are waiting at a receive buffer queue have the same priority and the drop eligible bits set, then the "oldest" frame is dropped between the two is dropped. Thus, the embodiments disclosed herein use both destination and receive port information to determine whether a frame should be dropped.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine implemented method for a network device having a plurality of queues for receiving information from another device, comprising:
    receiving a first frame at a receive queue of the network device;
    determining that the receive queue of the network device has reached a programmable threshold value;
    when the receive queue has reached the programmable threshold value, attempting to select a second frame waiting at the receive queue that is eligible for being dropped;
    wherein the second frame selection comprises:
        a first preference when a drop eligibility bit is set in a frame header by a sender of the frame, when a priority established for the frame indicates that the frame is drop eligible and when a destination for the frame is congested, wherein the congestion of the destination for the frame is determined by quantized congestion notification (QCN) or enhanced transmission selection (ETS); and
        a second preference when a drop eligibility bit is set in a frame header by a sender of the frame and when a priority established for the frame indicates that the frame is drop eligible; and
    discarding the second frame when the frame is drop eligible or discarding the first frame when the receive queue is full and no second frame is selected.

2. The method of claim 1, wherein the network device is a switch element having a plurality of ports.

3. The method of claim 2, wherein at least one of the plurality of ports of the switch element is configured to operate as a Fibre Channel port.

4. The method of claim 2, wherein at least one of the plurality of ports of the switch element is configured to operate as an Ethernet port.

5. The method of claim 2, wherein at least one of the plurality of ports of the switch element is configured to operate as a Fibre Channel over Ethernet port.

6. The method of claim 1, wherein the network device is an adapter.

7. A non-transitory, machine readable storage medium having stored thereon instructions for performing a method for a network device having a plurality of queues for receiving information from another device, comprising machine executable code which when executed by at least one machine, causes the machine to:
    receive a first frame at a receive queue of the network device;
    determine that the receive queue of the network device has reached a programmable threshold value;
    attempt to select a second frame waiting at the receive queue that is eligible for being dropped, when the receive queue has reached the programmable threshold value;
    wherein the second frame selection comprises:
        a first preference when a drop eligibility bit is set in a frame header by a sender of the frame, when a priority established for the frame indicates that the frame is drop eligible and when a destination for the frame is congested, wherein the congestion of the destination for the frame is determined by quantized congestion notification (QCN) or enhanced transmission selection (ETS); and
        a second preference when a drop eligibility bit is set in a frame header by a sender of the frame and when a priority established for the frame indicates that the frame is drop eligible; and
    discard the second frame when the frame is drop eligible or discarding the first frame when the receive queue is full and no second frame is selected.

8. The storage medium of claim 7, wherein the network device is a switch element having a plurality of ports.

9. The storage medium of claim 8, wherein at least one of the plurality of ports of the switch element is configured to operate as a Fibre Channel port.

10. The storage medium of claim 8, wherein at least one of the plurality of ports of the switch element is configured to operate as an Ethernet port.

11. The storage medium of claim 8, wherein at least one of the plurality of ports of the switch element is configured to operate as a Fibre Channel over Ethernet port.

12. The storage medium of claim 7, wherein the network device is an adapter.

13. A system, comprising:
    a network device having a plurality of queues for receiving information from another device, the network device comprises a processor to execute instructions stored in a memory to:

receive a first frame at a receive queue of the network device;

determine that the receive queue of the network device has reached a programmable threshold value;

attempt to select a second frame waiting at the receive queue that is eligible for being dropped, when the receive queue has reached the programmable threshold value; wherein the second frame selection comprises:

a first preference when a drop eligibility bit is set in a frame header by a sender of the frame, when a priority established for the frame indicates that the frame is drop eligible and when a destination for the frame is congested, wherein the congestion of the destination for the frame is determined by quantized congestion notification (QCN) or enhanced transmission selection (ETS); and a second preference when a drop eligibility bit is set in a frame header by a sender of the frame and when a priority established for the frame indicates that the frame is drop eligible; and discard the second frame when the frame is drop eligible or discarding the first frame when the receive queue is full and no second frame is selected.

14. The system of claim 13, wherein the network device is a switch element having a plurality of ports.

15. The system of claim 14, wherein at least one of the plurality of ports of the switch element is configured to operate as a Fibre Channel port.

16. The system of claim 14, wherein at least one of the plurality of ports of the switch element is configured to operate as an Ethernet port.

17. The system of claim 14, wherein at least one of the plurality of ports of the switch element is configured to operate as a Fibre Channel over Ethernet port.

18. The system of claim 13, wherein the network device is an adapter.

* * * * *